United States Patent [19]
Dunlap et al.

[11] Patent Number: 5,600,114
[45] Date of Patent: Feb. 4, 1997

[54] REMOTE UNMANNED BANKING CENTER

[75] Inventors: Scott R. Dunlap, Feasterville; Annette B. Montante, Abington, both of Pa.

[73] Assignee: Facilities Engineering and Design Consultants, Inc., Southampton, Pa.

[21] Appl. No.: 531,746

[22] Filed: Sep. 21, 1995

[51] Int. Cl.$^6$ .................................................... G06F 17/60
[52] U.S. Cl. ............................... 235/379; 902/35; 902/30
[58] Field of Search .................................. 235/375, 379, 235/380; 362/26, 27, 29, 31, 32; 902/35, 30, 9, 10; 340/149

[56] References Cited

U.S. PATENT DOCUMENTS

| | | | |
|---|---|---|---|
| D. 269,822 | 7/1983 | Barthel | 902/30 X |
| D. 273,422 | 4/1984 | Elliott | 902/35 X |
| 3,836,980 | 9/1974 | Gross, Jr. et al. | 346/22 |
| 3,876,864 | 4/1975 | Clark et al. | 235/379 |
| 4,109,238 | 8/1978 | Creekmore | 235/379 X |
| 4,580,040 | 4/1986 | Granzow et al. | 902/15 |
| 5,202,549 | 4/1993 | Decker et al. | 235/379 |

FOREIGN PATENT DOCUMENTS

| | | | |
|---|---|---|---|
| 0049663 | 3/1984 | Japan | 235/379 |

*Primary Examiner*—Donald T. Hajec
*Assistant Examiner*—Thien Minh Le
*Attorney, Agent, or Firm*—Caesar, Rivise, Bernstein, Cohen & Pokotilow, Ltd.

[57] ABSTRACT

A unmanned banking center for location within a building. The banking center is remote from a central banking facility, but is electronically coupled thereto to convey data therebetween. The unmanned center is arranged to have patrons come to it to conduct various transactions typically done at a conventional bank branch and includes a master computer, flooring, plural pivotable seats, and first, second, and third transaction stations. The first station is a kiosk-like enclosure containing a automated teller machine. The second station comprises plural baffled wall sections, each mounting a respective telephone. The third station houses a video monitor and an interactive video terminal. The telephones are connected to master computer, which in turn is connected by modem to the main computer system of the financial institution operating the remote banking center. Respective swingable stools are permanently mounted immediately adjacent respective ones of the baffled wall sections and the interactive video terminal, to enable the patrons to use the telephones and/or the terminal to acquire financial information therefrom. The flooring is of a distinctive appearance to establish a directional line toward the first station and generally along the second and third stations so that patrons may queue up along that line for access to the automated teller machine, to the telephones, or to the interactive video terminal. The video monitor of the third station continuously displays an informational video which is viewable by the patrons in the queue.

10 Claims, 3 Drawing Sheets

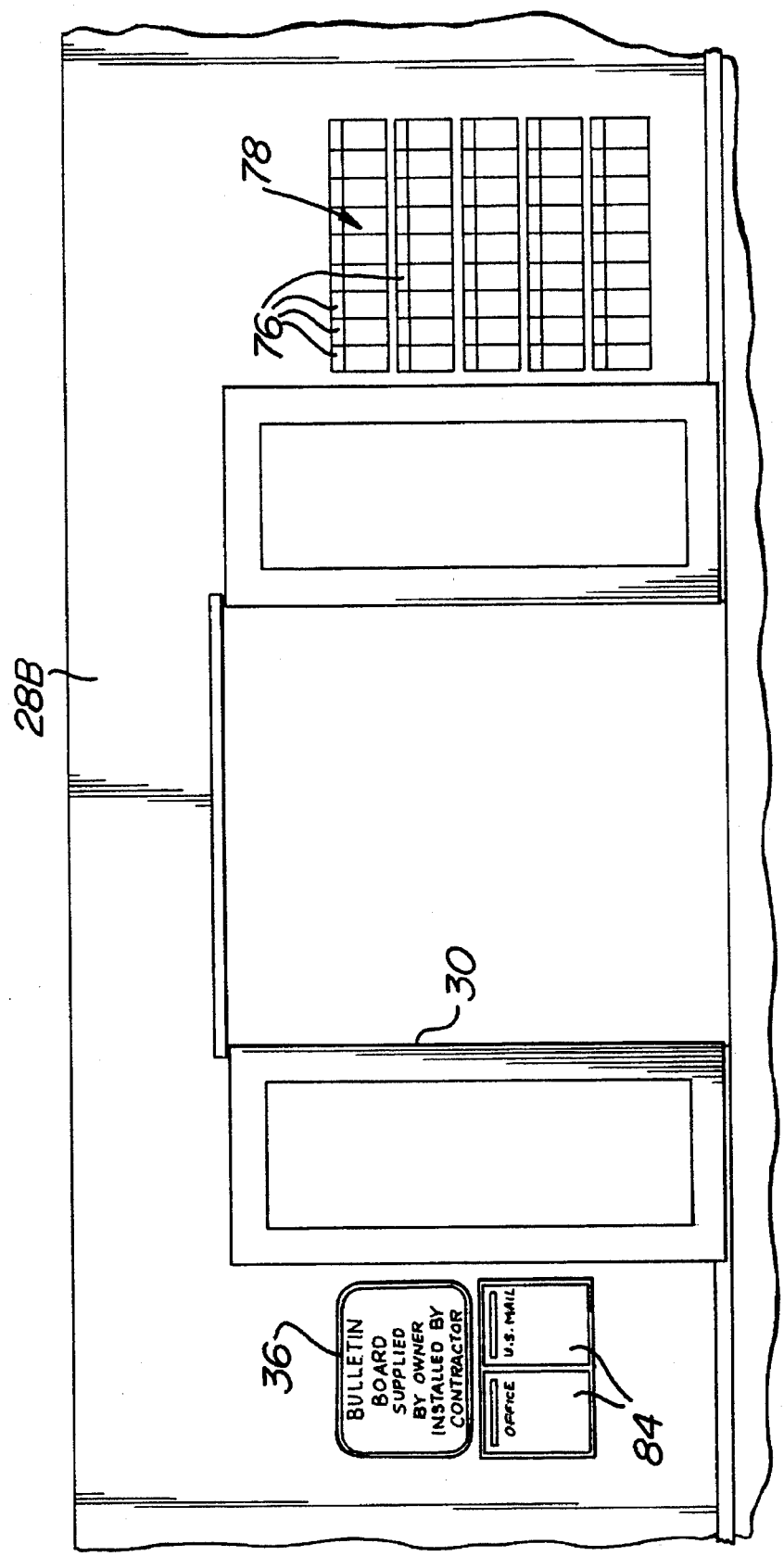

REMOTE UNMANNED BANKING CENTER

BACKGROUND OF THE INVENTION

This invention relates generally to banking and more particularly to unmanned banking centers for providing services to patrons normally provided from manned conventional bank branches.

The costs of establishing a typical branch office of a bank or a credit union are quite high. In addition to the building costs, and the equipment costs, there are the costs attendant with the staffing of the branch by tellers, and the like. Thus, the number of branches that a financial institution makes available is frequently limited to substantially less than the number which may be required to adequately service the community and the community suffers from the lack of adequate banking facilities. This problem is exacerbated where the community to be serviced is one having a high crime rate, due to the considerations of safety and security for the personnel of the branch.

While the use of automated teller machines (ATMs) has alleviated the problem somewhat by providing the public with means to gain access to one's bank to make deposits and withdraws from a machine which can be located anywhere, the need never the less exists for more than the service provided by such machines. Loans, for example, cannot be made via an ATM machine.

Examples of prior art systems or equipment for providing some unmanned banking services, e.g., deposits, withdrawals, check cashing, etc., are found in the following U.S. Pat. Nos.: 3,876,864 (Clark et al.), 4,109,238 (Creekmore), and 4,580,040 (Granzow et al.), Notwithstanding the above, a need presently exists for an integrated unmanned banking center which can be located anywhere to provide the typical banking or other financial services to patrons of the center, yet without requiring any staff at the center.

OBJECTS OF THE INVENTION

Accordingly, it is a general object of this invention to provide a remote banking center which addresses the needs of the prior art.

It is another object of this invention to provide an unmanned remote banking center which is simple in construction, relatively low in cost, and inexpensive to maintain, so that it can be located anywhere, e.g., at locations which heretofore were deemed not conducive for having a manned bank branch located thereat.

It is yet another object of this invention to provide an integrated, unmanned remote banking center which provides many of the services typically provided by a manned bank branch.

It is yet another object of this invention to provide an integrated, unmanned remote banking center which is easy to use by its patrons.

It is still another object of this invention to provide an unmanned remote banking center which is aesthetically pleasing in appearance.

It is still another object of this invention to provide an unmanned remote banking center which is secure.

SUMMARY OF THE INVENTION

These and other objects of this invention are achieved by providing a unmanned banking center for location within a building having a floor. The unmanned banking center is located remote from at least one central banking facility and enables patrons of the remote banking center to carry on activities normally conducted at a manned bank office or bank branch, e.g., deposit and withdraw funds, apply for and secure loans, receive information regarding financial services provided, etc.

The remote unmanned banking center basically comprises a master computer, floor covering means, plural seats, a first transaction station, a second transaction station, and a third transaction station. The first transaction station is in the form of a kiosk-like enclosure containing a automated teller machine disposed on the floor of the building. The second station comprises a wall having plural telephones mounted thereon and which are connected coupled to the center's master computer. The third station is in the form of a housing disposed on the floor of the building and containing a video monitor.

The wall forming the second transaction station basically comprises plural, angularly oriented baffled wall sections mounted in a sequence so as to be parallely off-set from each other immediately between the kiosk of the first station and the housing of the third station. Respective ones of the plural seats are permanently mounted immediately adjacent respective ones of the baffled wall sections, with each of the baffled wall sections having mounted thereon a respective telephone for use by the remote banking center's patrons to receive financial information therefrom, e.g., the patron's present balance, loan information, etc.

Each of the baffled wall sections is arranged to prevent the sound of the patron using the telephone mounted thereon from disturbing a patron seated at the telephone at an adjacent wall section.

In accordance with one preferred aspect of this invention the master computer is connected via a modem to the central computer system of the institution operating the remote unmanned banking center.

The floor covering means, e.g. carpeting, is fixedly secured to mounted on the floor of the building for establishing a directional line toward the first transaction station and along the second and third transaction stations so that plural patrons using the remote banking center may queue up along that line.

The video monitor is arranged to continuously display an informational video thereon, e.g., a promotional video describing the institution operating the banking center, for easy viewing by the patrons in the queue, e.g., persons who are waiting for access to the automated teller machine or to the telephones.

Each of the seats of the remote banking center which is located adjacent the baffled wall is arranged to have a patron sit thereon to use the associated telephone to directly access the master computer and/or the financial institution's central computer system to receive financial information therefrom, e.g., information regarding a the balance in an account, loan rates available, interest rates available, etc.

In accordance with one preferred aspect of this invention the remote banking center also includes an interactive video terminal, an associated keyboard, and an associated video display forming a portion of the third station. One of the seats of the remote banking center is permanently mounted immediately adjacent the computer terminal to enable one of the patrons to sit down and use the computer terminal to acquire information therefrom, e.g., fill out a loan application.

DESCRIPTION OF THE DRAWINGS

Other objects and many attendant features of this invention will become readily appreciated as the same becomes better understood by reference to the following detailed description when considered in connection with the accompanying drawings wherein:

FIG. 3 is a front elevational view of the inside wall of the room in which the remote banking center of FIG. 1 is located.

DETAILED DESCRIPTION OF THE PREFERRED EMBODIMENTS

Figure 1:
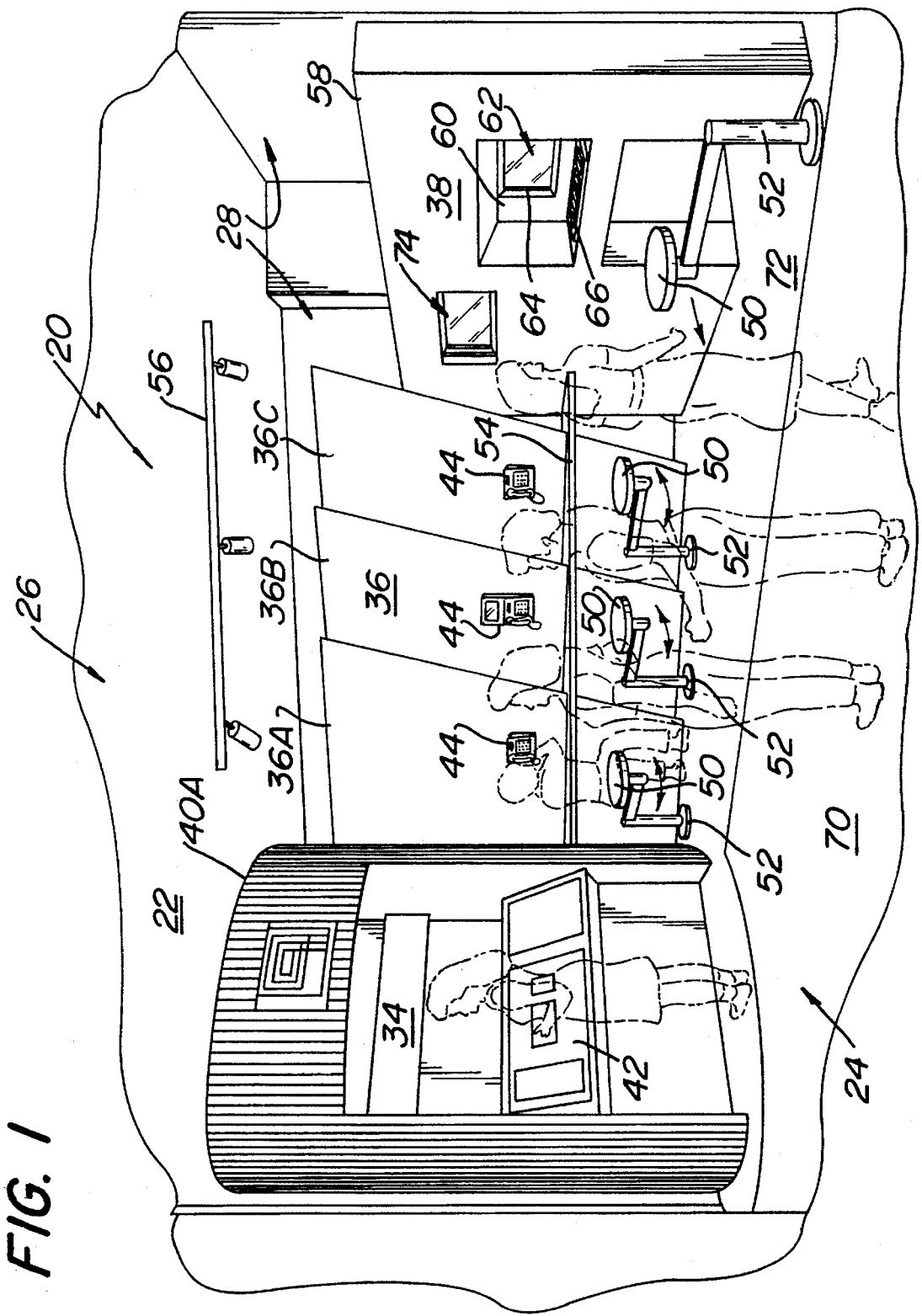
FIG. 1 is an isometric view of a remote banking center constructed in accordance with this invention and located within a room in a conventional building, with patrons of the center being shown in phantom in a queue and using the equipment of the center.

Referring now to various figures of the drawing where like reference numerals refer to like parts there is shown at 20 in FIG. 1, a remote, unmanned banking center constructed in accordance with this invention which can be operated twenty-four hours a day, in safety, to enable patrons of the facility to conduct all types of activities typically carried out at conventional bank branches. The center 20 is electronically connected, as will be described later, to the central or main computer system (not shown) of the financial institution operating the center 20, and to at least one of that institution's facilities at which personnel, e.g., tellers, loan officers, etc., are located.

Figure 2:
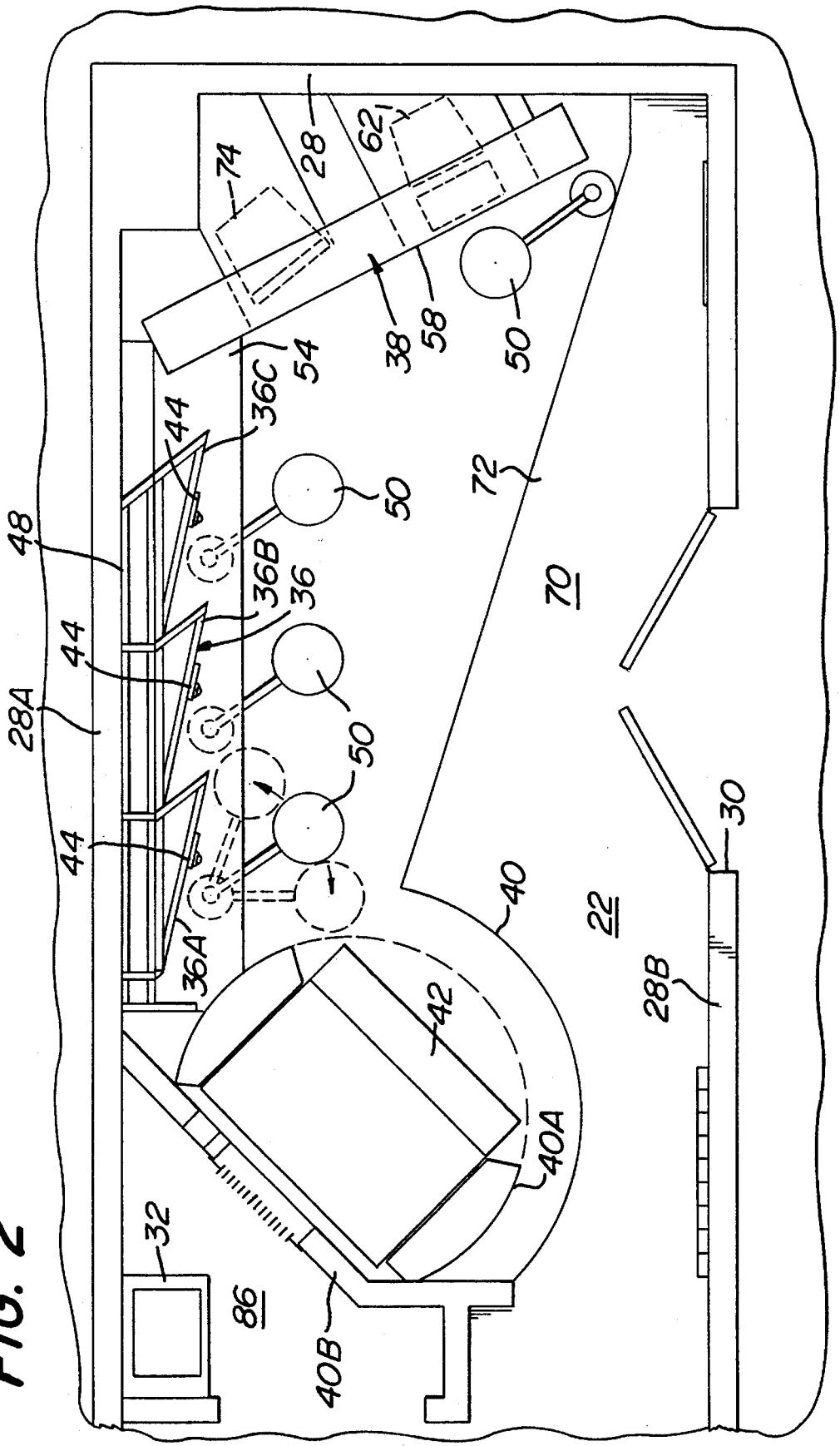
FIG. 2 is a top plan view of the remote banking center shown in FIG. 1.

As will be appreciated from the discussion to follow the remote banking center 20 is a somewhat compact arrangement of various components and structures which are integrated into a self-contained unit for ready disposition within any suitably sized room 22 in any type of building, conventional or otherwise. The room has a floor 24, a ceiling 26, and walls 28, one of which includes a doorway 30 (FIGS. 2 and 3).

In accordance with a preferred embodiment of this invention the components and structures making up the remote banking center 20 are designed and arranged to make them "user friendly", i.e., so that patrons of the center can use them easily, and quickly, and without requiring any special knowledge or training. Moreover, the center is constructed and illuminated in a manner to establish a sense of intimacy, privacy, and security, without making the patrons feel shut-in or claustrophobiac. Thus, the remote unmanned banking center 20 of this invention provides a sense of ease of use, comfort, and security to its patrons.

The center 20 is in the form of a plurality, e.g, three, "transaction stations" to which the patrons of the center can go to perform some task or to acquire information. The operation of the center is controlled by a master computer 32 (FIG. 2) which is located in a closet (to be described later) forming a part of the center 20. The closet is inaccessible by the center's patrons, but is readily accessible by authorized personnel.

The first transaction station is designated by the reference numeral 34 and constitutes a station at which patrons can withdraw or deposit funds. The second transaction station is designated generally by the reference numeral 36 and, in fact, comprises plural stations 36A, 36B, and 36C, from which the patrons can acquire financial or other banking related information via associated telephones (to be described later). The third transaction station is designated by the reference numeral 38 and serves as a station at which patrons can acquire financial information via an interactive computer terminal. In addition the third transaction station includes a video monitor for displaying a promotional or other informational video to patrons of the remote banking center while they are awaiting use of its facilities. Thus, the second and third transactions stations establish what can be referred to as an "information area" of the center.

As can be seen clearly in FIGS. 1 and 2 the first transaction station 34 basically comprises a casework or kiosk-like enclosure 40 holding a conventional ATM machine 42. The kiosk includes a cylindrical front wall 40A and a planar rear wall 40B. the cylindrical front wall has a recess in which the ATM machine is located and illuminated. The rear wall of the kiosk forms a wall of the center's closet and includes an opening therein to provide access to the rear of the ATM machine by authorized personnel from the closet. A conventional video camera (not shown) is mounted in the kiosk above the ATM machine to provide an image of users of the machine, as is conventional.

The second transaction station 36 is in the form of a wall extending in a general linear path between the ATM kiosk 40 and the third transaction station 38. The wall includes plural vertical sections or panels forming the stations 36A, 36B, and 36C. Each of the panels has a respective telephone 44 mounted thereon. Each telephone 44 is connected to the center's master computer 32 to enable the patron to use the telephone to acquire information from the master computer.

As can be seen clearly in FIG. 2, and as will be described later, the center's master computer 32 is located in the center's closet behind the ATM kiosk so that it cannot be seen (and its presence is unknown) by the center's patrons. The master computer 32 includes menu-driven software stored on any suitable storage medium, e.g., a hard disk drive, CD ROM, etc., which enables the patron using the keypad of anyone of the telephones 44 to follow verbal instructions. In so doing the patron can get information regarding various services provided by the bank which would normally be provided by a teller or loan officer at a conventional manned bank branch. That information can be specific personal information for the patron, e.g., information regarding the patron's current saving's or checking's account balance, or can be general information regarding services available, e.g., information regarding current bank loan rates, interest rates, etc.

In accordance with one preferred embodiment of this invention the master computer 32 is, in turn, electrically connected, via modem or other means (not shown), to the central computer system of the financial institution operating the remote unmanned banking center 20. That central computer system will typically be located at some facility located remotely from the building in which the unmanned banking center 20 is located. In addition, the master computer 32 of the unmanned banking center 20 is also preferably connected, via modem or some other means (not shown), and associated telephone lines, to some central or main office of the bank at which some person may be available to personally answer questions or provide other information to the patron of the remote center 20 via any of the telephones 44. To expedite the information gathering process preferably one of the telephones 44 is a videophone. This enables the patron to see the person to whom he/she is speaking, and vice-versa, to provide a more "personal touch" for some transactions, e.g., applying for a loan.

In the interest of providing a measure of privacy to the user's of the telephones 44, the wall sections 36A, 36B, and 36C are arranged in a baffle-like orientation. In particular, each of the wall sections is a generally planar panel of a somewhat sound absorbing material, e.g., a multi-perforated metal sheet. The panels are mounted on a steel frame 48 immediately adjacent the back wall 28A of the room so that the panels are oriented vertically, but at an acute angle to the building's back wall. In particular, the panels are parallely offset from one another, as clearly seen in FIG. 2. This arrangement of the panels creates three, somewhat private, telephone spaces for the patrons.

For the comfort and privacy of the patrons using the telephones of the transaction stations 36A, 36B, and 36C, respective seats 50 are mounted on the floor adjacent each of the offset baffled panels. The seats preferably comprise stools which are adjustable, e.g., pivotable toward and away from the station with which they are associated, to enable a patron to sit on the stool at a comfortable distance from the telephone while using it. In particular, each of the stools 50 is mounted to swing or pivot horizontally (as shown by the phantom lines in FIG. 2) on a respective vertical post 52. Each post is permanently mounted, e.g., bolted, to the floor 24 of the room 22.

A common counter or table top 54 is fixedly mounted across the baffled panels 36A, 36B, and 36C to serve as a writing surface and/or to enable the patron using any of the telephones to put personal items down on the counter.

The remote unmanned center is illuminated from above by track lighting 56. The lights are oriented to provide a modest level of overall illumination to the center, while directing the bulk of their output to each particular component of the center, e.g., at each telephone and counter portion 54 located thereunder. This lighting tends to further enhance the patron's sense of privacy, while providing sufficient light to enable the patron to see clearly at that location. A soffit (not shown) with recessed lights is provided along the ceiling of the room along the front wall 28B to illuminate that wall and to provide some overall illumination for the center 20.

The third transaction station 38 basically comprises a rectangular casework or housing 58 formed of any suitable material, e.g., wall board. The housing 58 extends at an angle to the wall making up the second transaction stations 36, as can be clearly seen in FIG. 2. As mentioned earlier the third transaction station 38 is arranged to provide an interactive computer terminal for use by the patron's of the unmanned banking center. To that end the housing 58 of the transaction station 38 includes a alcove 60 in the housing behind which a conventional computer 62, e.g., a PC, is located. The computer includes a disk drive and/or CD ROM player (not shown) for storing software which enables the user (patron) to interact with the computer to receive information in response to his/her input. In particular, the computer 62 includes a video monitor or screen 64 which is mounted in the housing 58 at the rear of the alcove 60 and a keyboard 66 which disposed on the bottom surface of the alcove. The bottom surface of the alcove forms a counter for the patron to use when at the interactive terminal.

The interactive computer terminal is arranged to provide information regarding banking services available in response to keyboard entries provided by the patron. Various menus or options available to the user are provided on the video screen based on the software in the computer and the information keyed into the keyboard by the patron using the terminal. The interactive terminal may be set up to provide various functions. For example, it may enable the patron to fill out a loan application at the terminal in response to various prompts and menus appearing on the video screen. A printer (not shown) may be located at the interactive computer terminal to enable the patron to have a copy of his/her loan application for his/her records.

In accordance with a preferred embodiment of this invention, the computer 62 forming the interactive terminal is interconnected to the center's master computer 32. The interactive software may changed as conditions warrant. Thus, for example, since the center's master computer 32 is, in turn, connected via a modem to the financial institution's central computer system or some other facility, the software of the interactive terminal may be changed by command from any of those sources.

A seat 50 is mounted in front of the housing 58 immediately adjacent the alcove 60 for the patron using the interactive computer terminal 62. The seat 50 is constructed like those described earlier so that it can be swung toward and away from the interactive computer. A knee space 68 is provided in the housing below the alcove to receive the knees of the patron using the interactive computer terminal so that that patron can get as close to the keyboard and screen as is desired in the interests of comfort and privacy.

Inasmuch as a number of patrons of the center 20 may be awaiting use of any of its transaction stations, the center 20 includes a floor covering 70 which provides a distinguishing visual appearance from the remaining portion of the room's floor to establish a line directed to the ATM machine 42 (the most commonly used transaction station) along which the patrons can form a queue. As can be seen clearly from FIG. 2, the line established by the floor covering 70 extends along the second and third transaction stations so that patrons will tend to queue up along the line while awaiting use of the ATM machine or any of the other transaction stations. In the interests of comfort the floor covering 58 is preferably a low pile carpet so as to provide a soft and comfortable standing surface, yet be long wearing. The remaining portions of the floor of the room are covered by other flooring material 72, e.g., vinyl tile, which is readily visually distinguishable from the carpet 70. The tiles are preferably oriented so that they are parallel to the line established by the carpet.

In order to provide some diversion for patrons waiting in the queue, while also providing information of value to the bank or other institution operating the center 20, the housing 58 of the third transaction station 38 includes a video monitor 74 mounted therein for displaying a promotional video to be seen by the persons in the queue. To that end the video monitor 74 is disposed at approximately eye level and located close to the second transaction station 36C so that patrons standing in the queue may readily view and hear an informational video provided by the monitor 74. It is anticipated that the informational video be of a general interest. Thus, for example, if the remote banking center 20 forms a part of a credit union network, the informational video provided by the monitor 74 may contain general information describing the operation of a credit union.

The sound for the informational video is provided by speakers (not shown) mounted in the housing 58. The video monitor 74 is driven by a videotape player (not shown) located within the center's closet, under the control of the center's master computer 32. Preferably, the video tape can be cycled for continuous operation.

As can be seen clearly in FIG. 3 promotional printed material 76, e.g., brochures, applications, etc., for use by the patrons of the unmanned center can be made available from a wall rack 78 forming a part of the center 20. The wall rack is mounted on the front wall 24B adjacent the doorway 30 and includes plural pockets for holding respective ones of the brochures, applications, etc. therein. In accordance with one design for the center, as shown in FIG. 3, one or more mailboxes 84 are disposed on the front wall of the room on the opposite side of the doorway 30 to enable patrons to post mail. In addition a bulletin board 86 providing messages is also be mounted on that wall.

As mentioned earlier the unmanned banking center's master computer 32 is located in a closet which is inaccessible to the patrons of the center. In particular, as can be seen in FIG. 2, the center 20 includes a small closet 86 located behind the ATM kiosk 40. This closet includes a door (not shown) which is lockable to enable only authorized personnel access to the interior of the closet 86. The center's main computer 32, as well as its modem, and associated telephone lines are located within the closet 86. In addition, the videotape player for driving the monitor 74 is also located within the closet. Access to the rear of the ATM machine is provided via the closet 86 to enable the ATM machine to be filled and emptied of cash in privacy and with security. Alternatively, the closet 86 may form a portion of a small office or workroom disposed immediately behind the ATM kiosk, with access to that room being provided via a lockable door located to the side of the kiosk. In such a case the closet need not have a lockable door thereon, since access to the closet will be restricted to only those authorized personnel who have a key to the workroom door.

Without further elaboration the foregoing will so fully illustrate our invention that others may, by applying current or future knowledge, adapt the same for use under various conditions of service.

We claim:

1. A remote unmanned banking center for location within a building having a floor, said banking center comprising a master computer, floor covering means, plural seats, a first transaction station, a second transaction station, and a third transaction station, said first station comprising a kiosk containing a automated teller machine, said second station comprising a wall with plural telephones mounted thereon, said third station comprising a housing in which a video monitor is located, said wall comprising plural, angularly oriented wall sections disposed sequentially immediately between said kiosk and said third station, with each of said wall sections having an associated telephone mounted thereon, said telephones being connected to said main computer for providing financial information, respective ones of said plural seats being permanently mounted immediately adjacent respective ones of said wall sections, said video monitor being arranged to continuously display an informational video, said floor covering means being fixedly mounted on the floor of the building for establishing a directional line toward said first transaction station and along said wall so that plural patrons of the remote banking center may queue up along that line to said first station, and wherein the patrons in the queue can readily view said video monitor while waiting for access to said automated teller machine and/or said telephones, each of said seats being arranged to have a person seated thereon so that said person can use the telephone to access said master computer to receive information therefrom.

2. The remote banking center of claim 1 wherein said third transaction station houses an interactive computer terminal, keyboard, and an associated video display, and wherein one of said seats is permanently mounted immediately adjacent said computer terminal to enable one of the patrons to sit down and use the computer terminal to acquire information therefrom.

3. The remote banking center of claim 1 wherein said floor covering comprises carpeting of a contrasting appearance to the remaining flooring of the building.

4. The remote banking center of claim 1 wherein each of said seats is pivotally mounted with respect to its associated baffled wall section so that each seat can swing with respect thereto, to facilitate a patron sitting thereon.

5. The remote banking center of claim 2 wherein each of said seats is pivotally mounted with respect to its associated wall section so that each seat can be swing with respect thereto so that the patron sitting thereon can adjust his/her distance from said wall section, and wherein said seat immediately adjacent said computer terminal is pivotally mounted with respect to said housing so that said seat can swing with respect thereto so that the patron sitting thereon can adjust his/her distance from said terminal.

6. The remote banking center of claim 1 wherein each of said wall sections is constructed and arranged to prevent the sound of the patron using the telephone thereat from disturbing a patron seated at an adjacent wall section.

7. The remote banking center of claim 1 wherein said informational video provides promotional information about the institution operating the center.

8. The remote banking center of claim 1 additionally comprising a closet located behind said kiosk, said closet being accessible only to authorized personnel to provide access to the interior of said ATM machine, said master computer being located within said closet.

9. The remote banking center of claim 1 wherein said master computer is connected to a central computer system of the institution operating the remote banking center.

10. The remote banking center of claim 8 wherein said master computer is connected to a central computer system of the institution operating the remote banking center by a modem, and wherein said modem is located within said closet.

* * * * *